Oct. 25, 1938.   W. SCHMIDT   2,134,150
LIGHT ADVERTISING DEVICE
Filed Feb. 29, 1936   2 Sheets-Sheet 1
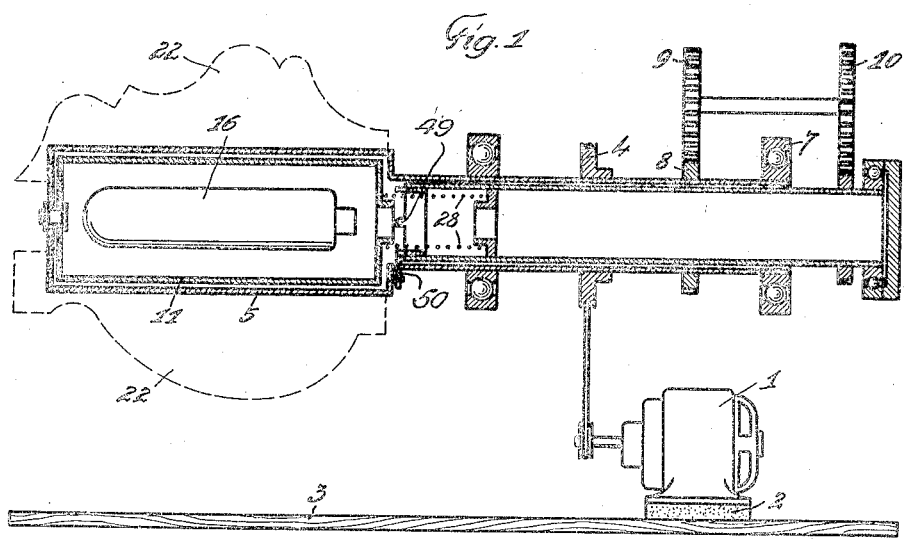
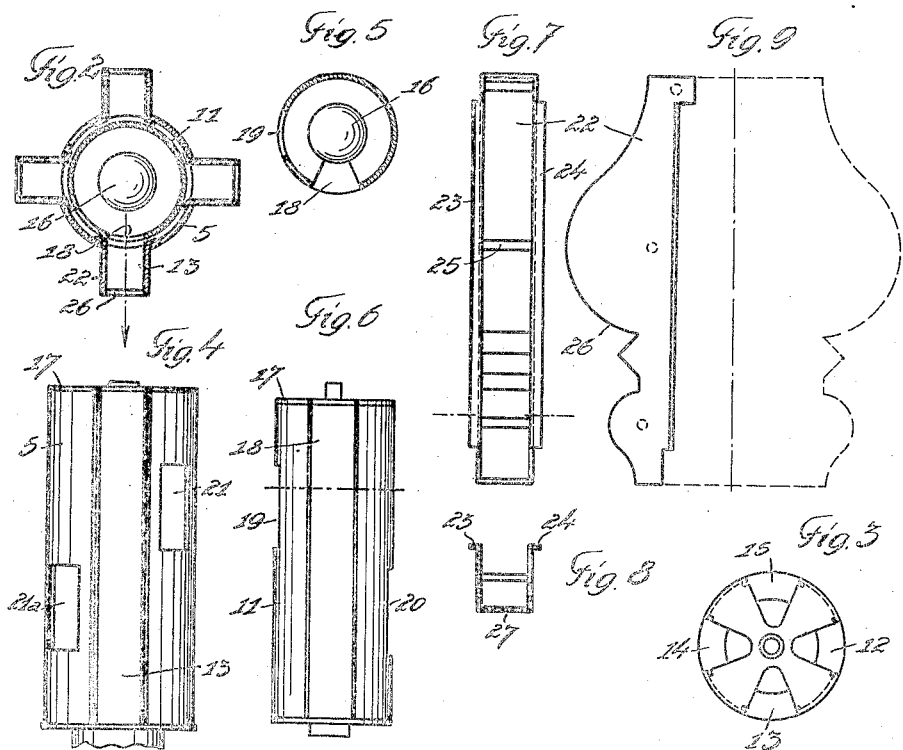
INVENTOR.
Wilhelm Schmidt.
By Chatwick Company Attys.

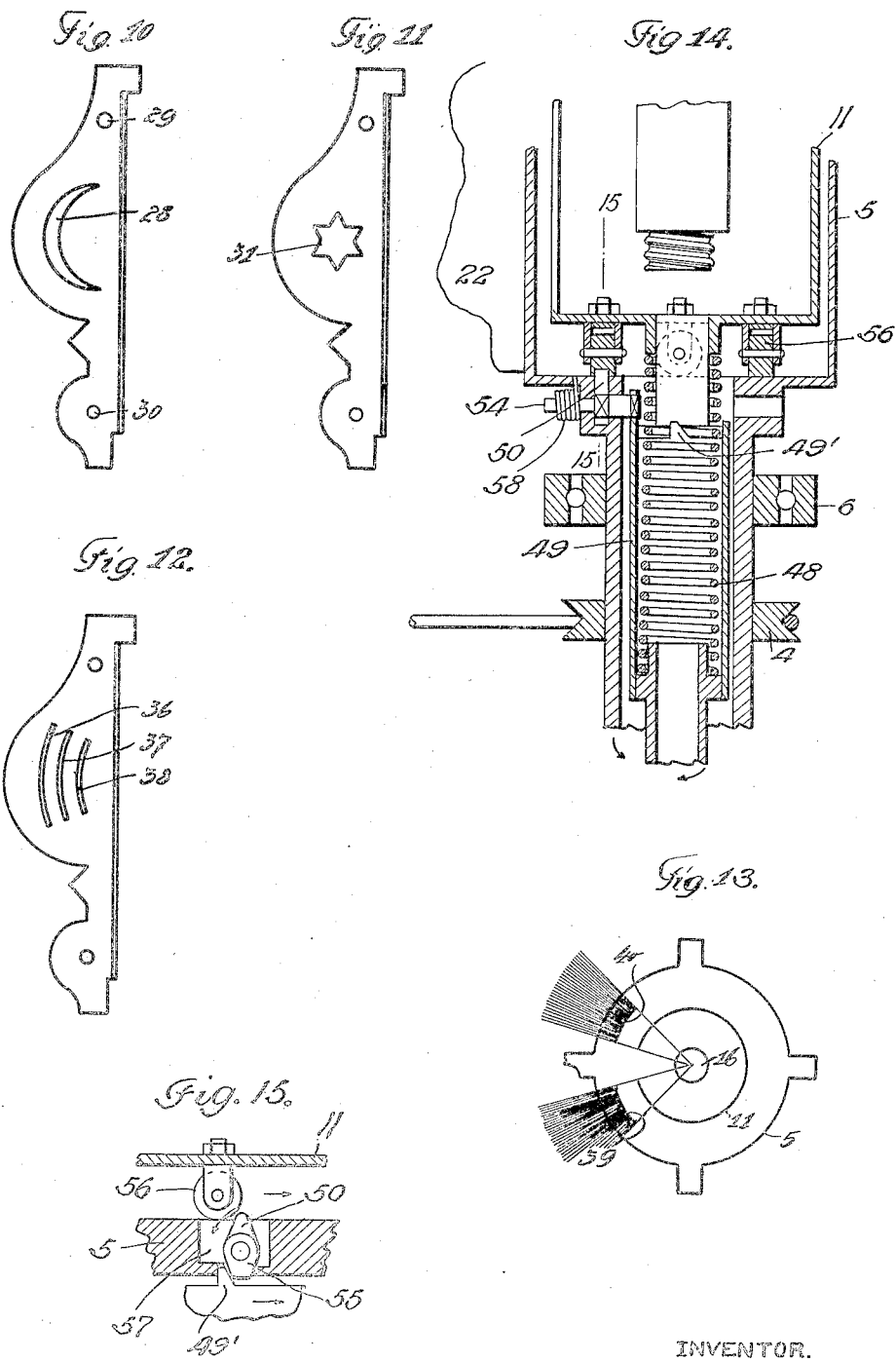

Patented Oct. 25, 1938

2,134,150

UNITED STATES PATENT OFFICE 2,134,150

LIGHT ADVERTISING DEVICE

Wilhelm Schmidt, Berlin-Schmargendorf, Germany, assignor to Hans Jürgen Mulert, New York, N. Y.; Erika Annemarie Mulert sole heir of said Hans Jürgen Mulert, deceased Application February 29, 1936, Serial No. 66,479
In Germany March 1, 1935

11 Claims. (Cl. 40—77)

This invention relates to advertising apparatus and the like and one of its principal objects is to provide a device by which optical illusions of various objects will be brought into view.

Another object is to provide a display or decoration device which includes a plurality of rotary patterns having transparent areas which may be provided with colored diapositives and which are successively and automatically illuminated for a predetermined period of time during the continuous rotation thereof to produce optical illusions varying in configuration and/or color.

Other objects and particulars of the invention will be obvious from the following detailed description in connection with the accompanying drawings in which:

Fig. 1 is a vertical section through an advertising device according to the invention, Fig. 2 is a cross section through the cylinder, Figs. 3 and 4 show the outer cylinder, Figs. 5 and 6 show the inner cylinder, Figs. 7, 8 and 9 show a pattern casing, Figs. 10 to 12 show further constructional forms of the pattern casing, Fig. 13 shows a screening device.

Fig. 14 is a sectional view of a part of the device embodying the invention illustrating in detail the means for successively illuminating the various patterns and Fig. 15 is a section along the line 15—15 of Figure 14 with portions broken away.

In terms of broad inclusion, therefore, the invention contemplates a device in which a rotating pattern or design is illuminated during the rotation thereof to bring into view optical illusions of objects and messages varying in configuration and/or color according to the pattern or design employed. In carrying out this idea one or several patterns having transparent areas may be arranged about the source of light and adapted to rotate therewith uninterruptedly. In addition means may be provided to confine the ray of light to one pattern for predetermined periods of time and to switch the same successively to the other pattern during the rotation thereof.

In the specific example illustrated in the drawings, the different patterns or models are mounted on a cylinder which may be rotated together with or separately from the source of light which is mounted within a second cylinder having a slit or gap through which the ray of light will project. The patterns or models may have transparent areas and provided with desired diapositives to produce a desired optical effect.

The second cylinder within which the source of light is mounted is provided with a switching mechanism which is controlled by the rotation of the outer cylinder carrying the patterns to switch automatically the ray of light successively to the other patterns for predetermined periods of time. The rotating pattern upon which the ray of light is projected will thus produce an illuminated figure, the configuration and color of which will depend upon the pattern and the diapositives, while the non-illuminating patterns will not be visible.

It will be understood, however, that the invention is not restricted to the identical means illustrated in the drawings but that other means may be used to accomplish the purpose of the invention as above set forth and which fall within the appended claims.

Now referring in more detail to the drawings:

In Fig. 1, the outer cylinder 5 is through a pulley 4 driven from a motor 1 which is mounted on a base plate 3, a resilient plate 2 being interposed between motor and base plate. This cylinder is supported in ball bearings 6 and 7 and by means of tooth wheels 8, 9, 10 transfers its movement to the inner cylinder 11. As shown in Figs. 3 and 4, the outer cylinder possesses four slits or recesses 12, 13, 14, 15 extending over its entire length. A light source 16 is arranged in the axis of the cylinder. The inner cylinder 11 which is shown in Figs. 5 and 6, possesses one slit 18 only extending over its entire length through which the light of the source of light is projected to that pattern which is just situated in front of the slit. The short slits 19 and 20 which are arranged opposite to corresponding slits 21 and 21a of the outer cylinder, serve for exhibiting diapositives which are arranged closely around the lamp 16.

As will be seen from Figs. 7, 8 and 9, the pattern casings 22 consist of two lateral walls 23 and 24 which are connected by cross ribs 25. Further ribs serving for pushing the patterns into the slits 12, 13 etc. are fitted to these lateral walls. The outer edge of the pattern which is designated 26, by rotation produces the figure indicated in Fig. 9 in dotted lines. The rear side of the pattern casing designated with 27 consists of a transparent coloured material e. g. parchment or vellum paper.

The jerk- or step-like switching of the cylinder 11 on Fig. 1 is effected by the following mechanism.

Said inner cylinder 11 carries cylindrical cams 56 which bear against the outer cylinder 5 and the apparatus also comprises a cylindrical releasing sleeve 49 the edge of which is provided with cams 49'. The cylinder 11 and the releasing sleeve 49 are resiliently connected by the spring 48. The outer cylinder 5 has a pawl shaft 54 the inwardly directed end of which has a short lever 55 within the path of the cams 49' and by means of these cams during relative movement of both cylinders imparts an angular movement to the cam shaft. The centre of the cam shaft has a pawl releasing the roller 56 carried by the inner cylinder 11 by the rotation of the shaft 54 (see section A—B).

The pawl protrudes through a slot into the interior of the outer cylinder and, when at rear, prevents the previously tensioned inner cylinder from further rotating. The return movement of the pawl is effected by the helical spring 58 provided at the other end of the pawl shaft 54 after the cam 49' has been released by the cam lever 55. The winding up or loading of the spring 28 is effected by rotating the cylinder 11 somewhat slower than the cylinder 5. With each switching the interior cylinder springs back by the desired angle, e. g. 90° in case of four sections so that its slit 18 is positioned in front of another pattern and directs the light of the lamp to this pattern.

According to Fig. 10 a half-moon 28 is cut out of the lateral wall. 29 and 30 are round holes which appear as rings during the rotation. In Fig. 11 a star 31 is cut out of the lateral wall of the pattern.

The pattern as per Fig. 12 shows curved slits 36, 37 and 38 in the two lateral walls which in rotation produce different balls which are shining according to the colour of the paper with which the slits are screened.

To get distinct edges of the handle or the star and for preventing the figure from being wiped, screens 39 and 40 are provided between the light source 16, and the pattern 34, as per Fig. 13, these screens projecting shadows to the luminescent figure and causing the handle or the star to leave the shadow and to be exposed to the light in its most favourable position. Also by diaphragms of different design and construction which are arranged before the light opening of the patterns, the light opening can be made visible on a very small portion only of the circumferential path. In this manner, the figures which are to appear in fixed position within the rotating luminescent figure, become extremely clear and distinct.

I claim:—

1. A light advertising device, comprising, in combination, a source of light, an exterior cylinder rotating around said source of light, a plurality of slits in said cylinder, patterns having a transparent wall and being arranged in front of said slits, an interior cylinder, a through-going slit in said interior cylinder, an automatic device moving said interior cylinder in step-like manner and causing said slit therein to be successively positioned opposite to each of said patterns in said outer cylinder.

2. A light advertising device, comprising, in combination, a source of light, an exterior cylinder rotating around said source of light, a plurality of slits in said cylinder, patterns having a transparent wall and being arranged in front of said slits, an interior cylinder, a gear drive for rotating said interior cylinder with a somewhat lower speed than said exterior cylinder, a slit in said interior cylinder, and a spring mechanism for rapidly switching back said interior cylinder by a 90° angle in certain periodic intervals.

3. A light advertising device, comprising, in combination, a source of light, an exterior cylinder rotating around said source of light, a plurality of slits in said cylinder, patterns having a transparent wall and being arranged in front of said slits, an interior cylinder, a gear drive for rotating said interior cylinder with a somewhat lower speed than said exterior cylinder, a spring mechanism for rapidly switching back said interior cylinder by a 90° angle in certain periodic intervals, a through-going slit in said interior cylinder, and diapositives arranged closely around said source of light and made visible through additional slits in said cylinders.

4. A light advertising device, comprising, in combination, a source of light, an exterior cylinder rotating around said source of light, a plurality of slits in said cylinder, pattern casings consisting of two lateral walls connected by ribs and a light-transparent, coloured back and being arranged in front of said slits, an interior cylinder, a gear drive for rotating said interior cylinder with a somewhat lower speed then said exterior cylinder, a spring mechanism for rapidly switching back said interior cylinder by a 90° angle in certain periodic intervals, a through-going slit in said interior cylinder, and diapositives arranged closely around said source of light and made visible through additional slits in said cylinders.

5. A light advertising device, comprising, in combination, a source of light, an exterior cylinder rotating around said source of light, a plurality of slits in said cylinder, pattern casings consisting of two lateral walls provided with shaped perforations and connected by ribs and a light-transparent, coloured back and being arranged in front of said slits, an interior cylinder, a gear drive for rotating said interior cylinder with a somewhat lower speed than said exterior cylinder, a spring mechanism for rapidly switching back said interior cylinder by a 90° angle in certain periodic intervals, a through-going slit in said interior cylinder, and diapositives arranged closely around said source of light and made visible through additional slits in said cylinders.

6. A light advertising device, comprising, in combination, a source of light, an exterior cylinder rotating around said source of light, a plurality of slits in said cylinder, pattern casings consisting of two lateral walls provided with shaped perforations, a perforated oblique intermediate wall between said lateral walls and a light-transparent, coloured back and being arranged in front of said slits, an interior cylinder, a gear drive for rotating said interior cylinder with a somewhat lower speed than said exterior cylinder, a spring mechanism for rapidly switching back said interior cylinder by a 90° angle in certain periodic intervals, a through-going slit in said interior cylinder, and diapositives arranged closely around said source of light and made visible through additional slits in said cylinders.

7. A light advertising device, comprising, in combination, a source of light, an exterior cylinder rotating around said source of light, a plurality of slits in said cylinder, pattern casings consisting of two lateral walls provided with shaped perforations, a perforated oblique intermediate wall between said lateral walls and a light-transparent, coloured back and being arranged in front of said slits, further screening surfaces between said source of light and said exterior cylinder, said screening surfaces shadowing a part of the produced luminescent figures, an interior cylinder, a gear drive for rotating said interior cylinder with a somewhat lower speed than said exterior cylinder, a spring mechanism for rapidly switching back said interior cylinder by a 90° angle in certain periodic intervals, a throughgoing slit in said interior cylinder, and diapositives arranged closely around said source of light and made visible through additional slits in said cylinders.

8. A light-advertising device comprising in combination a plurality of different patterns, means for rapidly and uninterruptedly rotating said patterns and means for successively illuminating said patterns during the rotation thereof for predetermined periods of time whereby different optical illusions according to the patterns employed will be successively brought into view.

9. A light-advertising device comprising in combination a source of light, a plurality of different patterns having transparent areas provided with desired diapositives mounted about said source of light, means for rotating said patterns and said source of light, means for confining the ray of light to a single pattern and switching means for automatically and successively illuminating said patterns for predetermined periods of time during the rotation thereof whereby different optical illusions according to the pattern employed will be successively brought into view.

10. A light advertising device for producing optical illusions of various objects and displays comprising in combination a rotatable support, a pattern radially mounted on said support, said pattern having transparent areas arranged to correspond in conformation and appearance to the object or display, the illusion of which is to be produced, means for illuminating said pattern, means for rapidly rotating said support and said pattern whereby an image of the respective objects will be brought into view.

11. A light advertising device for producing optical illusions of various objects and displays comprising in combination a rotatable support, a pattern radially mounted on said support, said pattern having a plurality of spaced visible areas arranged to correspond in conformation and appearance to the object or display, the illusion of which is to be produced, means for causing visibility of said pattern, means for rapidly rotating said support and said pattern whereby an image of the respective objects will be brought into view.

WILHELM SCHMIDT.